US006456933B1

(12) United States Patent
Hessing

(10) Patent No.: US 6,456,933 B1
(45) Date of Patent: Sep. 24, 2002

(54) NAVIGATION METHOD AND NAVIGATION SYSTEM FOR MEANS OF LOCOMOTION

(75) Inventor: Bernd Hessing, Holle (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/868,830

(22) PCT Filed: Dec. 11, 1999

(86) PCT No.: PCT/DE99/03962

§ 371 (c)(1),
(2), (4) Date: Sep. 27, 2001

(87) PCT Pub. No.: WO00/38130

PCT Pub. Date: Jun. 29, 2000

(30) Foreign Application Priority Data

Dec. 21, 1919 (DE) .......................................... 198 59 080

(51) Int. Cl.⁷ ............................................... G01C 21/34
(52) U.S. Cl. ....................................... 701/209; 701/202
(58) Field of Search ................................. 701/209, 210, 701/207, 208, 213, 202; 340/990, 995, 988

(56) References Cited

U.S. PATENT DOCUMENTS 6,269,303 B1 * 7/2001 Watanabe et al. ........... 340/988
6,324,471 B1 * 11/2001 Katayama et al. .......... 701/209

FOREIGN PATENT DOCUMENTS

| EP | 0 636 863 | 2/1995 |
| EP | 0 782 119 | 7/1997 |
| JP | 09 178 499 | 7/1997 |

* cited by examiner

Primary Examiner—Richard M. Camby
(74) Attorney, Agent, or Firm—Kenyon & Kenyon

(57) ABSTRACT

A method for navigating from a starting point, especially from an instantaneous location, to a destination, a routing algorithm of a navigational system for a means of locomotion, particularly a motor vehicle, ship, or airplane, calculating a route from the instantaneous location to the destination via nodal points stored in a digital map. In the case in which at least one of the nodal points of the route to be calculated is not contained in an internal digital map stored internally in the navigational system, the part of the route which exclusively includes nodal points of the internal digital map is calculated by an internal routing algorithm on the basis of the internal digital map as an internally calculated route portion, and the part of the route which does not include nodal points stored in the internal digital map is calculated by an external routing algorithm as an externally calculated route portion on the basis of a digital map stored externally with respect to the navigational system, transitional nodal points from the externally calculated route to the internally calculated route and/or vice versa being determined.

15 Claims, 3 Drawing Sheets

NAVIGATION METHOD AND NAVIGATION SYSTEM FOR MEANS OF LOCOMOTION

FIELD OF THE INVENTION

The present invention relates to a method of navigating from a starting location, especially an instantaneous position, to a destination, a routing algorithm of a navigational system for an apparatus of locomotion, in particular a motor vehicle, ship or airplane, calculating a route from starting location to destination via nodal points stored in a digital map. The present invention also relates to a navigational system for an apparatus of locomotion, especially a motor vehicle, ship or airplane, having an internal route memory, an internal navigation device connected to it, an internal digital map and a data communications device for communicating with an external off-board navigational system.

BACKGROUND INFORMATION

Navigational systems, such as those in motor vehicles, are based on digital maps carried along in read-only memories. Since all functional elements are located in the vehicle, these navigational systems are classified as autonomous navigational systems. Navigational systems are also known in which the routes are calculated outside the actual route guidance system. For example, the route to be traveled by the vehicle may be calculated in a traffic telematics center. These so-called off-board navigational systems have the advantage that the range of use is not limited right from the beginning by volume and state of updating of the digital maps carried along. On the other hand, the speed, convenience and precision of an autonomous navigational system can only be achieved by a communications effort which is economically not feasible at this time.

However, conventional navigational systems have the disadvantage that either a completely autonomous route calculation takes place, or a completely external or off-board route calculation takes place, each having the disadvantages described above.

SUMMARY OF THE INVENTION

An object of the present invention is to make available an improved navigation method and an improved navigational device of the kind named above, which will eliminate the disadvantages recited above.

To accomplish this, according to the present invention it is provided that, in a navigation method of the type named above, in the case in which at least one of the nodal points of the route to be calculated is not contained in an internal digital map stored internally in the navigation system, the part of the route, which includes exclusively nodal points of the internal digital map, is calculated by an internal routing algorithm on the basis of the internal digital map as the internally calculated part of the route, and the part of the route not including nodal points stored in the internal digital map is calculated by an external routing algorithm on the basis of a stored digital map that is external with respect to the navigation system, as the externally calculated part of the route, transitional nodal points from the externally calculated route to the internally calculated route, and/or vice versa, being determined.

This has the advantage that a hybrid navigation system is available, in which the detailed data of the internal digital map are used, as far as possible, for the route guidance, and only in ranges lying outside the internal digital map a route guidance is used on the basis of an externally stored digital map. Thereby, according to the present invention, the advantages of an autonomous navigational system, namely, a high route guidance accuracy are unified with the advantages of an off-board navigational system, namely, no range limitation based on the digital map. At the same time, the disadvantages of an autonomous navigational system, namely, conducting navigation exclusively within the internally stored map, as well as the disadvantages of an off-board navigational system, namely, high transmission costs due to the large data volumes to be transmitted, are avoided. Thus, the user has available to him the advantages of the "off-board" navigational system and the autonomous navigational system under a uniform operating surface having the best possible functions of each part.

In a preferred specific embodiment, the complete route is first calculated by the external routing algorithm, is transmitted to the navigational system, and subsequently that portion of the route, which includes exclusively nodal points stored in the internal map is calculated, and the corresponding portion of the externally calculated route is replaced by the internally calculated portion of the route.

In order to reduce communications costs and transmitting time, the internal routing algorithm first generates the internally calculated route, transmits data concerning still missing portions of the route, especially still missing nodal points and interchange nodal points, to the external routing algorithm, the external routing algorithm calculates only the still missing route portions and transmits these to the navigational system.

In a preferred specific embodiment, the internally calculated portion of the route is stored in the navigational system in an internal route memory, and the externally calculated portion of the route is stored in the navigational system in an external route memory, whereby either an internal navigation algorithm of the navigational system conducts a route guidance based on the route in the internal route memory, or an external route guidance algorithm of the navigational system conducts a route guidance based on the route in the external route memory.

Expediently, on reaching a transitional nodal point, switching takes place from the internal route guidance algorithm to the external route guidance algorithm when the apparatus of locomotion leaves the range of the internal digital map, or switching from the external route guidance algorithm to the internal route guidance algorithm takes place when the apparatus of locomotion reaches the range of the internal digital map.

Actual data are attained at all times in the internal route memory as well as the external route memory, if, during route guidance, nodal points already reached or passed sections of the route, are identified in the internal route memory as well as the external route memory as taken care of or passed, or are canceled, independently of which route guidance algorithm just happens to be active.

For rapid assignment of nodal points to the internal map or the external map, and for rapid retrieval of the corresponding interchange nodal points, internal nodal points stored in the internal digital map as well as external nodal points located outside the range of the internal digital map are stored in a destination input memory of the navigational system, and at least one interchange nodal point is stored for predefined external nodal points, the interchange nodal point being an internal nodal point contained in the internal digital map.

In order to optimize the selection of the interchange nodes, the interchange nodal points are determined in a separate communications step between the navigational system and an off-board navigational system, which executes the external routing algorithm and stores the external digital map, using a data protocol in the light of geographical descriptions of nodal points lying outside the internal digital map.

In one advantageous specific embodiment, after the input of a destination lying outside the range of the internal digital map, the navigational system transmits the input destination and a version number of the internal digital map to an off-board navigational system, which executes the external routing algorithm and stores the external digital map, from which the off-board navigational system determines an interchange nodal point from these data, going from which to the input destination the externally calculated portion of the road is calculated by the external routing algorithm and transmitted to the navigational system.

Expediently, the navigational system transmits a list of possible interchange nodal points to an off-board navigational system which carries out the external routing algorithm and stores the external digital map, the off-board navigational system selecting at least one suitable interchange nodal point according to the externally calculated portion of the route and transmitting it to the navigational system along with the externally calculated portion of the routs.

In another preferred specific embodiment the calculation of the externally calculated portion of the route occurs when the apparatus of locomotion leaves an area of the internal digital map.

In a navigational system of the type named above, the present invention allows for an external route memory connected to a data communications device as well as an external route guidance device connected to the external route memory to be provided, a switching device being further provided, which optionally activates the external or internal route guidance device during route guidance, depending on whether the apparatus of locomotion is inside or outside the range of the internal digital map.

This has the advantage that a hybrid navigation system is available, in which the detailed data of the internal digital map are used, as far as possible, for route guidance, and only in ranges lying outside the internal digital map route guidance is used on the basis of an externally stored digital map. Thereby, according to the present invention, the advantages of an autonomous navigational system, namely, a high route guidance accuracy are unified with the advantages of an off-board navigational system, namely, no range limitation based on the digital map. At the same time, the disadvantages of an autonomous navigational system, namely, conducting navigation exclusively within the internally stored map, as well as the disadvantages of an off-board navigational system, namely, high transmission costs due to the large data volumes to be transmitted, are avoided. Thus, the user has available to him the advantages of the off-board navigational system and the autonomous navigational system under a uniform operating surface having the best possible functions of each part.

In another embodiment of the present invention, the internal route memory and the external route memory are combined in one single memory.

DETAILED DESCRIPTION

Figure 1:
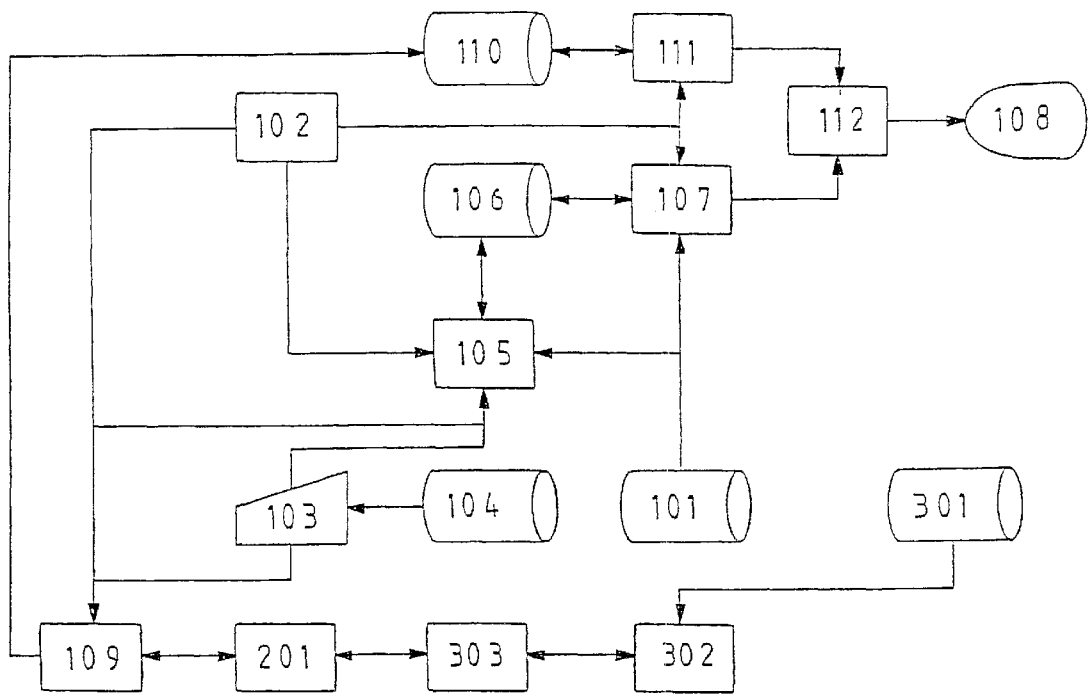
FIG. 1 shows a schematic block diagram of a preferred specific embodiment of a navigational system according to the present invention.

For the preferred exemplary embodiment of navigational system according to the present invention, illustrated in FIG. 1, an internal digital map 101 is provided. With the aid of a position finding device 102, furnished with diverse sensors such as a GPS antenna, tacho signal, the vehicle position is assigned with great accuracy to a section of digital map 101 if the vehicle is in the network stored in the map. A travel destination can be input to the navigational system via an input device 103. This is verified via a destination memory 104 and possibly identified as pertaining to the internal digital map 101. The destination input memory 104 and internal digital map 101 are expediently stored in the same storage medium, such as a CD-ROM. Thereupon a routing algorithm 105 calculates an internally calculated route or portion of a route from the position of the vehicle or from a starting location to the travel destination and stores this route in an internal route memory 106. The starting location does not necessarily have to match the instantaneous location of the motor vehicle. For example, the vehicle moves during the route interrogation, so that after a finished route calculation and route transmission the motor vehicle has already arrived at a position displaced from the starting location.

By way of a continuously performed comparison of the vehicle position registered by the position finding device 102 with the stored route, and with the aid of digital map 101, internal route guidance algorithm 107 reads out the travel route, the vehicle position and also travel directions to the destination, via a read-out device 108. This process is continuously repeated until route guidance is broken off or the destination is reached. In addition, a remote data transmission device 109 is provided for exchanging data with a traffic telematics center via communications networks 201. Using data received in such a way about traffic jams, routing algorithm 105 generates routes for detouring the traffic jams. The center or the off-board navigational system includes an external digital map 301, an external routing algorithm 302, as well as an input/output function 303, for instance, a device for remote data transmission for the input of the start and destination position as well as the output of the calculated route. In the center, data about actual and predicted traffic disruptions are used for seeking out routes, optionally using a dynamizing function. A route or portion of a route calculated externally by the off-board navigational system is entered into an external route memory 110. Here the route guidance proceeds with its own external route guidance algorithm 111.

In the hybrid navigational system according to the present invention, input device 103 and destination input memory 104 are broadened in such a way that not only destinations can be input to internal digital map 101. At the beginning of the route guidance one can then choose among the possibilities "autonomous route guidance", "off-board route guidance" and "hybrid route guidance". To do this, both internal route memory 106 (for autonomous route portions) and external route memory 110 (for off-board route portions) are kept available. Furthermore, internal route guidance algorithm 107 (map-based) and external route guidance algorithm (111) (off-board, e.g. based on GATS) should be carried out in duplicate. While driving, at interchange nodal points, using a switching device 112 of the hybrid system, which, for example, may be designed as a software switch, switching takes place from the autonomous to the off-board route guidance and back. The output device 108 and the communications device 109 can be used in both operating modes.

For the use in common of output device 108, both the autonomous and the off-board navigation work in a "turn by turn" method. Using such a method, when approaching a crossing, for instance, the driving directions create graphic or speech output comments on the actions to be performed ("take next right turn to B8", "take this right turn to B8").

Figure 2:
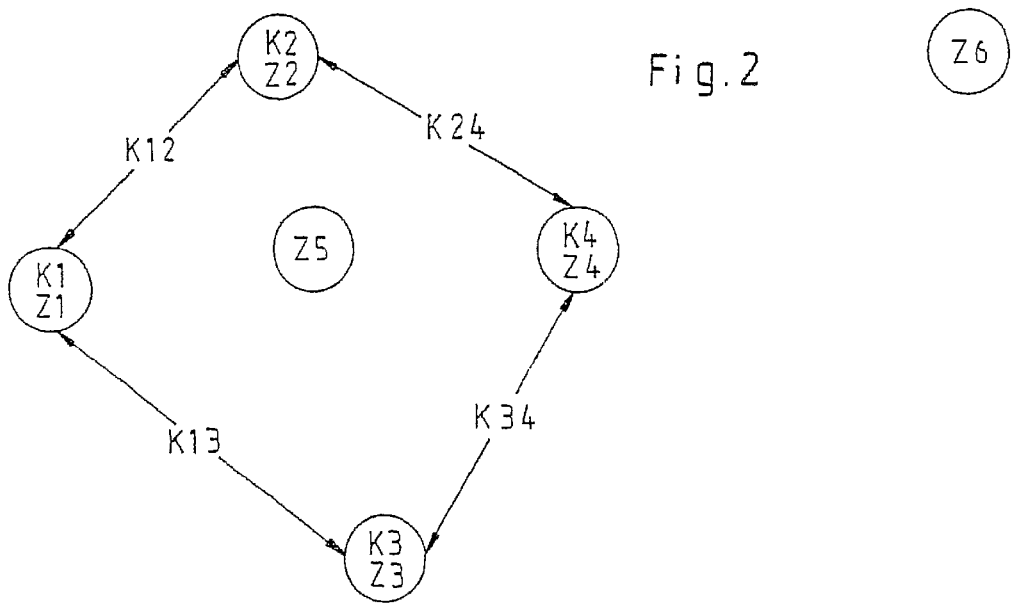
FIG. 2 shows a segment of an internal digital map of the navigational system of FIG. 1.

FIG. 2, for example, shows an internal digital map 101 in the vehicle, containing nodes K1 to K4 and edges K12, K13, K24 and K34. These form the area in which navigation can be autonomous. Furthermore, six off-board referable nodes Z1 to Z6 are shown. Using appropriate software, for example, such as look-up tables, the nodes K1 to K4 are recognized as being respectively identical to Z1 to Z4. For example, after off-board calculation of a direct route from Z1 to Z2, this is recognized internally in the vehicle as being identical to the autonomously calculable route from K1 to K2 which runs along edge K12.

If the navigational system is on a planned route guidance from K1 or Z1 to K2 or Z2, software switch 112 switches from the internal route guidance device 107 to external route guidance device 111 at any desired point, and back. For this, both route guidance devices or algorithms 107, 111, are active simultaneously, are supplied with data by position finding device 102, and, during the trip, sections already passed in the respective route memories 106 or 110 are marked as passed or are canceled. Here, of particular advantage is an automatically executed change from autonomous to off-board at interchange nodal points at which the area of the internal digital map 101 is left. This could happen, for example, in the following case. A route from K1 or Z1 to Z6 is being planned. A corresponding route cannot be planned or calculated in the autonomous system since Z6 is not contained in internal digital map 101. Off-board, the route Z1>Z2>Z4>Z6 would be calculated. By evaluation of similarities this route is analyzed. Since Z1 and Z4 can be assigned to map nodes K1 and K4, an internal route portion K1>K2>K4 is internally calculated and stored in the autonomous route memory 106. What is more, software switch 112 is finished with a rule such that, upon reception of route portions calculated off-board, these route portions lying in internal digital map 101 are recognized and autonomous route portions are calculated for them. Then, if on one section of the route both methods are possible, in an advantageous way the autonomous method is preferably used. Use of the internally calculated route portions permits more precise driving instructions through map-based position finding. In addition, the performance characteristics for restoring to the planned route, in this case, are more convenient because of the knowledge of the road network by internal digital map 101. This is relevant in case of a deliberate or unintentional branching off from the planned route. When it is recognized that no possibility of autonomous route guidance exists any longer, the switch 112 switches to the off-board route. In the example described, in the hybrid navigational system according to the present invention, when conducting a navigation from Z1 to Z6, this leads to the route worked out as follows: K1>K2>K4; switch from autonomous to off-board; Z4>Z6.

Analogously, this mechanism in reverse can also be used when leaving an off-board road portion. On the return trip from Z6 to K1, at node Z4 or K4 the possibility of autonomous route calculation would be recognized. Then the route would be as follows: Z6>Z4; switch from off-board to autonomous; K4>K2>K1.

Figure 3:
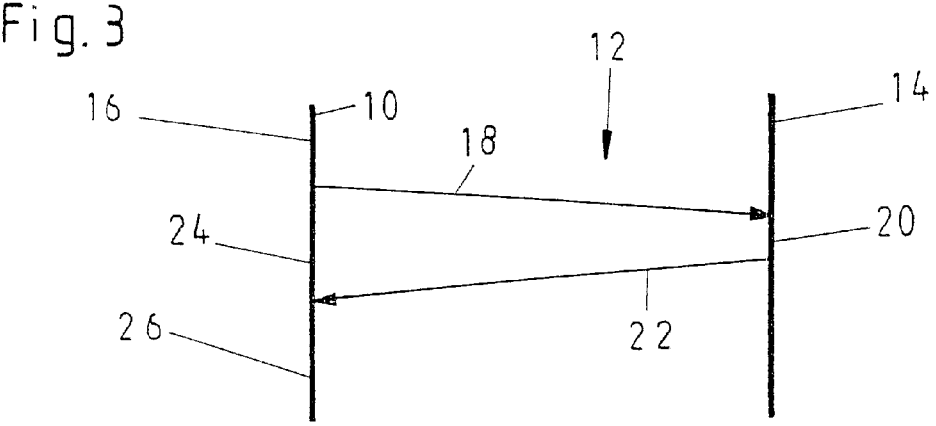
FIG. 3 is a first illustration of various communications steps or communications sequences between a navigational system and an off-board navigational system.

Since the transmission of off-board routes generates communications costs and transmission time, when requesting route calculations, it is advantageous to exclude from the calculations those portions where the route can be autonomously calculated. To do this, for each destination contained in destination input memory 104 and not in internal digital map 101, an accompanying network transitional nodal point is stored. For example, if Z6 is input as the destination, K4 will be found as the accompanying transition point, because it has been stored as such in the destination input memory 104. The route from K1 to K4 is then autonomously calculated, and the route from Z4 to Z6 is requested for an off-board calculation. FIG. 3 shows a corresponding sequence. In FIGS. 3 through 6, 10 designates the navigational system on the vehicle, 12 designates a message transmitted via data communications device 109 and 14 designates the off-board navigational system. At 16 the memory content of the destination input memory 104 is used to locate K4 as the local transition nodal point for Z6. At 18, a route from Z4 to Z6 is requested. At 20, the route Z4 >Z6 is calculated in off-board navigation system 14. At 22 the route 24 >26 is transmitted from the off-board navigational system 14 to the navigational system 10 in the vehicle. At 24 the internal route portion K1>K4 is calculated and route guidance starts at 26.

Figure 4:
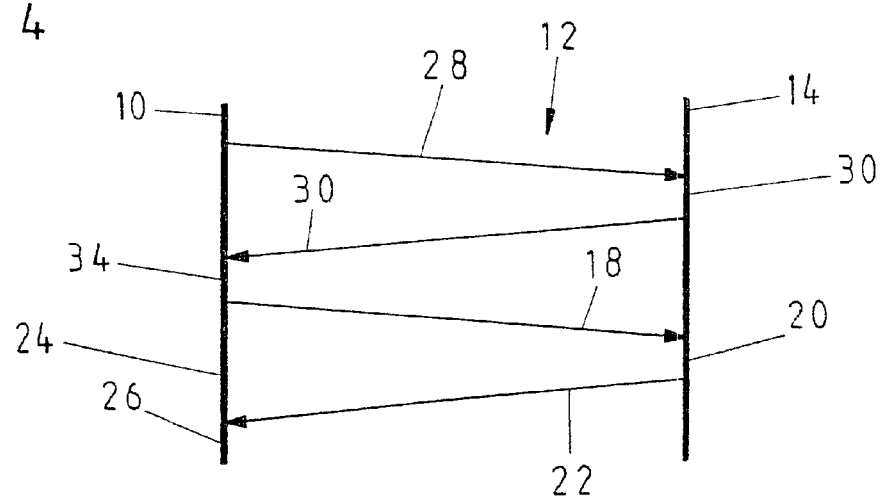
FIG. 4 is a second illustration of various communications steps or communications sequences between a navigational system and an off-board navigational system.

Alternatively, in a separate communications step, the interchange nodal points are negotiated between the hybrid navigational system 10 and the off-board navigational system 14 with the aid of a data protocol, in the light of geographical descriptions of nodes lying outside the digital map, as shown in FIG. 4. Here, for example, the assignment of the interchange nodal point K4 to the destination Z6 is not stored in destination input memory 104. Instead, as seen in FIG. 4, after input of destination Z6 via remote data transmission 28, the destination is identified in the off-board navigational system 14 at 30, and the approximate position of destination Z6 is transmitted back to the vehicle at 32, and then the next nearest interchange nodal point K4 is assigned there at 34 with the aid of a corresponding assignment algorithm.

Figure 5:
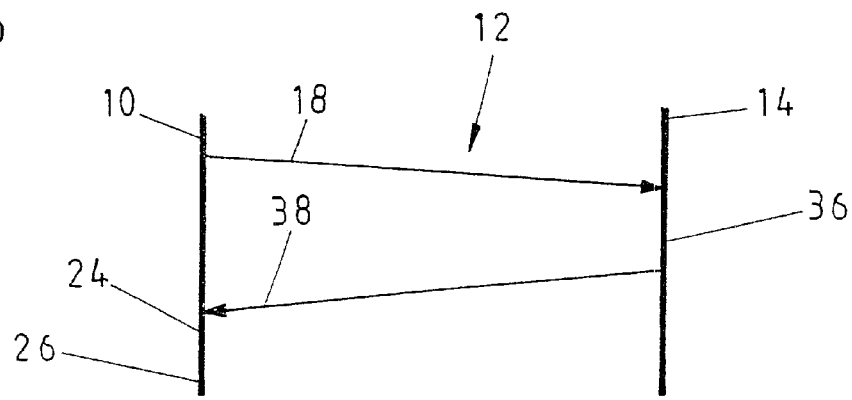
FIG. 5 is a third illustration of various communications steps or communications sequences between a navigational system and an off-board navigational system.

If internal digital map 101, present in navigational system 10 is also in device 14 used for the off-board calculation, then it is sufficient for the identification of the interchange nodal point, as illustrated in FIG. 5, to introduce into the route calculation inquiry 18 control information having an identification possibility of the version of internal digital map 101. This information is then used off-board in order to identify the transition nodal points at 36. For instance, the inquiry 18 may be for a route from Z1 to Z6 using digital map V1. Then, in communications step 38, route Z4 to Z6 is transmitted by the off-board navigational system 14 to the internal navigational system 10, and the message is given that an internal route calculation has to be made up to K4. This is done in 24, and in 26 route guidance starts again.

Figure 6:
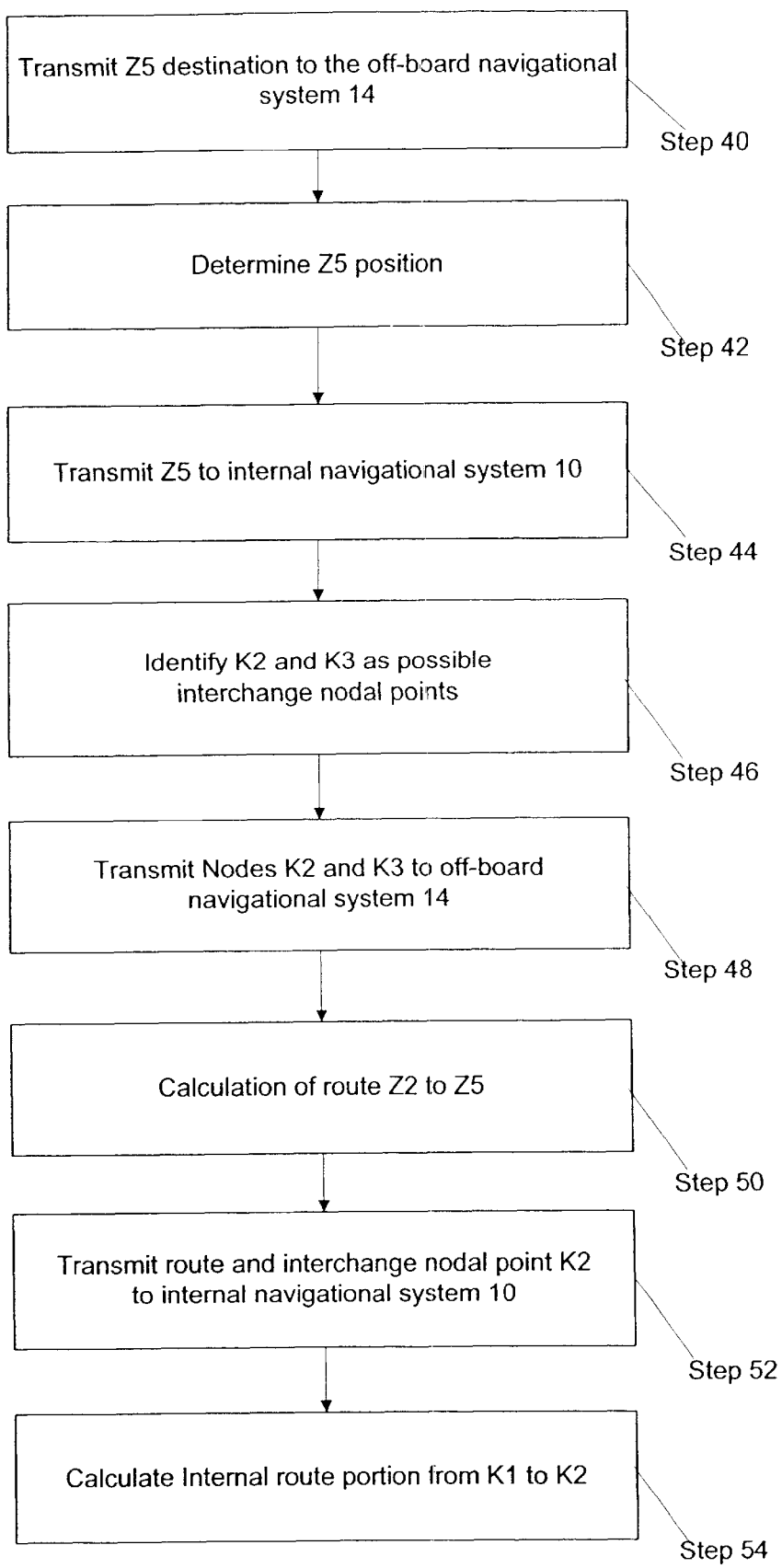

Alternatively, the control information can also include a list of possible transition points created in hybrid navigational system 10. The off-board navigational system 14 then selects the interchange nodal point to be used. FIG. 6 shows a corresponding sequence for getting from K1 to destination Z5. In communications step 40, Z5 is transmitted as destination to the off-board navigational system 14. In step 42 the position of Z5 is determined, and in communications step 44 it is transmitted to internal navigational system 10. In step 46, the nodes K2 and K3 are identified as possible interchange nodal points, and in communications step 48 (this is) transmitted to the off-board navigational system 14. In step 50, the route Z2 to Z5 is calculated and in communications step 52 this route, together with interchange nodal point K2, is transmitted to the internal navigational system 10. This determines that an internal route portion from K1 to K2 has to be calculated, which takes place in step 54.

The coding of the interchange nodal points includes, for example, geocodes according to GATS, TMC locations according to prENV 12313-3 or ERTICO ILOC's. In an alternative specific embodiment, route memories 106 and 110 are combined into a single one. In autonomously "drivable" portions indications are made there as to connection to its own digital map, and in "off-board" portions as to corridors corresponding to GATS protocol.

The realization of a hybrid system according to the present invention will be described using the example of a navigational system having dynamic APS (dynAPS). The destination input takes place there, either in that the destinations are input, via an input device, in the sequence "city", possibly "city part", "street name", "intersection or house number", by spelling and selection from lists or combinations of these. The possible destinations are taken from a destination input memory 104 on the CD-ROM having internal digital map 101. For the following two examples it is assumed that the beginning vehicle location is Cologne, the destination is Paris, and a CD-ROM containing the German road network has been inserted in the vehicle.

In order to make possible the hybrid route guidance to selected destinations outside internal digital map 101, this destination input memory 104 is enlarged by additional data, cf. FIG. 4. For the entry Paris (France), in the destination input memory 104 of the CD-ROM, lists are stored of possible transitional nodal points and rules for their selection. Let us say that, in a Germany CD-ROM and a vehicle location "North Rhine Westphalia" the interchange nodal point "A44 Aachen-Lichtenbusch" is selected. This occurs without the driver being able to recognize it. After the input of the destination, say, the driver has selected from the navigational settings the function "Telematic/Hybrid Route". If this setting has not taken place (autonomous route), after the selection of the destination and start of the route guidance an error message appears: "For this destination, travel recommendations can only be given using hybrid route guidance". When the setting is made with hybrid route guidance, a screen output takes place: "Route search via traffic telematics is running". Via a GSM mobile radio net there follows a route inquiry with the aid of possibilities of short message service present in dynAPS. The vehicle receives as reply a route list assembled according to GATS, from the border crossing Aachen-Lichtenbusch to the specified street within Paris. The list is constructed in view of the driving maneuvers that will need to be executed. For instance, on the trip to Paris it contains the changes of expressways in the area of Liege. During the inquiry, the autonomously calculable portion of the route is calculated in dynAPS. When both portions are at hand, route guidance can begin.

In dynAPS, the distance from the next driving maneuver is shown each time on a screen. At the approach to the place of the maneuver, a pictogram of the place of this maneuver appears, along with the entered expected travel path. At the approach to the expressway cloverleaf Aachen, coming from Cologne on the A4, this would be first the distance to the cloverleaf Aachen, and, on closer approach, an image signaling "exit right". The driving instructions are also spoken at the approach.

The approach to the border crossing Aachen-Lichtenbusch would be signaled in a similar way, "before long, drive straight ahead". Upon passing the border, autonomous route guidance is switched to off-board route guidance without this being noticed by the driver. The data for assignment to the driving instructions and the vehicle position for the planned route no longer come aided by digital map 101 on the CD-ROM but from route information received at the GATS center. The driver only becomes aware that he has left the area of the digital map from less precise driving instructions, because of less accurate position finding, and a different performance at exiting from the planned route. After the border crossing, the "normal" dynAPS would create the message "OFF MAP".

In the next example there will be shown a trip, using a hybrid APS, from Cologne to Steinfurt, Burgsteinfurt District, Wemhöferstiege. After the destination input, it is realized that the trip destination lies in a place in which only the center, but not the individual streets in the residential areas have been digitized. Support for the destination input, as in the previous example, by the deposit of data in the destination input memory, is not possible here. At a route inquiry via SMS, the hybrid APS transfers to the GAT center not only the starting position and the desired trip destination, but also an identification of the inserted CD-ROM (data volume, version), cf. FIG. 5. The GATS center can only recognize to which transition nodal point of the internal digital map 101 direction is to be made. A point is found here, as transitional nodal point, between the crossing B54/B54n, at the western entrance to the Burgsteinfurt District, and the point lying on B54 and stored on the CD-ROM as Burgsteinfurt/Center. From the crossing B54/B54n and past the transitional point the route to be taken in Burgsteinfurt to Wernhöferstiege is calculated at the center and transmitted to the vehicle. There, now, the route is calculated autonomously as far as the interchange point. Furthermore, the off-board route is entered into route memory 110. Switching from autonomous to hybrid route guidance is prepared after passing the crossing B54/B54n. The driving maneuver there is still executed under control of the autonomous route guidance. The next driving maneuver, "turn right" at the interchange nodal point is already taken from the off-board route. However, it is still turned on by the route guidance algorithm 105. Only after the maneuver executed at the interchange nodal point does off-board route guidance algorithm 111 take over directing.

After passing the interchange nodal point, the "normal" dynAPS would create the message "OFF ROAD". Indeed, the generation of a driving instruction, "turn right" for leaving the digitized street net would not be possible.

In summary, the present invention relates to a navigational system for navigating in a vehicle, a route stored in a navigational system for navigating being composed of route sections calculated, proportionately, in the vehicle using data of a digital map 101 (autonomously) and as received from an external routing 302 (off-board). For this, externally determined portions do not necessarily have to be contained in digital map 101 used in the vehicle for the routing. It is further advantageous to make the design such that the switching between the centrally and autonomously calculated sections takes place either controlled by a user, or, if desired, unobserved in the background, the individual route segments being furnished with control data controlling the switching, for automatic switching in the background, in the route memory.

It is especially advantageous that a uniform user interface is used for the output of driving instructions and of the route, and indeed independently of which type of route section is just being passed by the vehicle. Furthermore, the dual design of route memory 106, 110 is of advantage, route memory 110 containing the central, externally calculated route and the other route memory 106 containing the autonomous, internally calculated route, and, based on control data when needed, being switched from one to the other route memory. Also advantageous is the transmission of the externally determined portions via a remote data transmission device 109, such as by data radio in a mobile radio net such as SMS transmission in GSM. Here, the transmission can be directed both unidirectionally to the vehicle (broadcast) or it can use bidirectional data traffic. The externally calculated portions can be transmitted with the aid of GATS geocodes, with the aid of TMC locations, with the aid of ERTICO ILOC's or by other methods, according to GATS Appendix 5.3.1 and 1151.3.2. Alternatively, the externally calculated route can be fed in via a serial line-bound or infrared interface, a network interface, or by using a storage medium that is externally written and read in the navigational system (diskette, PCMCIA card, . . . ). Additionally advantageous is the automatic creation of control data in such a way that, at receipt of an externally determined route, those portions of the route which are unequivocally assignable in the digital map located in the vehicle, are replaced after the receipt by portions calculated in the vehicle.

Transmission of data via the digital map present in the vehicle is advantageous, so as to be able to use this version of the information in the external route calculation, whereby to determine externally only those portions of the route not calculable in the vehicle, and to transmit these into the vehicle, while the remaining portions are calculated in the vehicle. Advantageous, also, is the transmission of lists of possible entry and exit points of the vehicle to the center, for the route portions calculated there, suitable entry and exit points being selected in the center and transmitted to the vehicle for each corresponding portion of the route Also advantageous is the transmission of entry points and exit points which are obtained in the vehicle from geographic or other information concerning vehicle position and desired destinations, so as to let the external route calculation calculate only the sections from the starting position to the first entry point, or from the last exit point to the trip destination, or from one or more exit points lying on the route to the corresponding entry points occurring after them.

In those situations in which the vehicle leaves the area of digitized map 101, an inquiry for calculation of an external route calculation is created automatically or manually, and the result of this calculation is used for feedback into digitized street net 101 or for route guidance to the trip destination. When route guidance with the aid of the digitized map 101 is possible, switching takes place in an advantageous manner from route guidance with the aid of an external route to autonomously calculated route guidance. When route guidance with the aid of digitized map 101 is no longer possible, and the vehicle position can be assigned to the externally received route, then, in an advantageous manner, switching takes place from autonomous route guidance to the external route.

What is claimed is:

1. A method for navigating an apparatus of locomotion in accordance with a route including nodal points from one of a starting point and an instantaneous location to a destination in a case in which at least one of the nodal points of the route to be calculated is not contained in an internal digital map stored internally in a navigational system, the method comprising the steps of:

calculating that part of the route including exclusively nodal points of the internal digital map in accordance with an internal routing algorithm on the basis of the internal digital map to produce an internally calculated route portion;

calculating that part of the route not including those of the nodal points stored in the internal digital map in accordance with an external routing algorithm to produce an externally calculated route portion on the basis of an external digital map stored externally with respect to the navigational system;

determining transitional nodal points from the externally calculated route portion to the internally calculated route portion; and performing one of the steps of:

causing an internal route guidance algorithm of the navigational system to execute a route guidance on the basis of the internally calculated route portion, and causing an external route guidance algorithm to execute the route guidance on the basis of the externally calculated route portion.

2. A method for navigating an apparatus of locomotion in accordance with a route including nodal points from one of a starting point and an instantaneous location to a destination in a case in which at least one of the nodal points of the route to be calculated is not contained in an internal digital map stored internally in a navigational system, the method comprising the steps of:

first calculating the route completely in accordance with an external routing algorithm;

transmitting the completely calculated route to the navigational system;

subsequently calculating that portion of the route that includes exclusively those of the nodal points in the internal digital map in accordance with an internal routing algorithm; and replacing that portion of the completely calculated route corresponding to those of the nodal points exclusively in the internal digital map with that portion of the route calculated in accordance with the internal routing algorithm.

3. The method according to claim 1, wherein:

the internal routing algorithm first generates the internally calculated route portion, the internal routing algorithm transmits data concerning still missing portions of the route to the external routing algorithm, and the external routing algorithm calculates only the still missing portions of the route and transmits the calculated still missing portions of the route to the navigational system.

4. The method according to claim 3, wherein:

the still missing portions include still missing nodal points and interchange nodal points.

5. The method according to claim 1, wherein:

the internally calculated route portion is stored in the navigational system in an internal route memory, and the externally calculated route portion is stored in an external route memory.

6. The method according to claim 5, further comprising the steps of:
   on reaching an interchange nodal point, switching from the internal route guidance algorithm to the external route guidance algorithm when the apparatus of locomotion leaves a range of the internal digital map; and
   on reaching the interchange nodal point, switching from the external route guidance algorithm to the internal route guidance algorithm when the apparatus of locomotion reaches the range of the internal digital map.

7. The method according to claim 5, further comprising one of the steps of:
   during the route guidance, identifying in the internal route memory and the external route memory as one of taken care of and passed those of the nodal points corresponding to those portions of the route that are one of already reached and already passed, the identifying step being performed independently of which one of the internal route guidance algorithm and the external route algorithm is currently active; and
   during the route guidance, canceling in the internal route memory and the external route memory those of the nodal points corresponding to those portions of the route that are one of already reached and already passed, the canceling step being performed independently of which one of the internal route guidance algorithm and the external route algorithm is currently active.

8. The method according to claim 1, wherein:
   the nodal points include internal nodal points and external nodal points,
   the internal nodal points stored in the internal digital map and the external nodal points that are outside of a range of the internal digital map are stored in a destination input memory of the navigational system, and
   at least one interchange nodal point is stored in the internal digital map for predetermined external nodal points.

9. The method according to claim 1, further comprising the step of:
   in a separate communication between the navigational system and an off-board navigational system that executes the external routing algorithm and stores the external digital map, determining interchange nodal points in accordance with a data protocol in view of geographical descriptions of those of the nodal points lying outside the internal digital map.

10. The method according to claim 1, further comprising the step of:
    after an input of a destination location lying outside a range of the internal digital map, causing the navigational system to transmit the input destination location and a version number of the internal digital map to an off-board navigational system;
    causing the off-board navigational system to execute the external routing algorithm and to store the external digital map;
    causing the off-board navigational system to determine an interchange nodal point from the input destination location and the version number of the internal digital map;
    causing the external routing algorithm to calculate the externally calculated route portion from the interchange nodal point to the input destination location; and
    transmitting the externally calculated route portion to the navigational system.

11. The method according to claim 1, further comprising the steps of:
    causing the navigational system to transmit a list of possible interchange nodal points to an off-board navigational system;
    causing the off-board navigational system to execute the external routing algorithm and store the external digital map;
    causing the off-board navigational system to select at least one suitable interchange nodal point according to the externally calculated route portion; and
    causing the off-board navigational system to transmit the at least one suitable interchange nodal point to the navigational system along with the externally calculated route portion.

12. The method according to claim 1, wherein:
    a calculation of the externally calculated route portion occurs when the apparatus of locomotion leaves an area of the internal digital map.

13. A navigational system for an apparatus of locomotion, comprising:
    an internal route memory;
    an internal route guidance device connected to the internal route memory;
    an internal digital map;
    a data communications device for communicating with an external off-board navigational system;
    an external route memory connected to the data communications device;
    an external route guidance device connected to the external route memory; and
    a switching device for alternatively activating one of the external route guidance device and the internal route guidance device during a route guidance, depending on whether the apparatus of locomotion is one of within and outside a range of the internal digital map.

14. The navigational system according to claim 13, wherein:
    the apparatus of locomotion includes one of a motor vehicle, a ship, and an airplane.

15. The navigation system according to claim 13, wherein:
    the internal route memory and the external route memory are arranged in a single memory.

* * * * *